United States Patent [19]

Nakatani et al.

[11] Patent Number: 4,977,563
[45] Date of Patent: Dec. 11, 1990

[54] LASER APPARATUS

[75] Inventors: Hajime Nakatani; Yoshibumi Minowa; Hitoshi Wakata, all of Hyogo, Japan

[73] Assignee: Mitsubishi Denki Kabushiki Kaisha, Tokyo, Japan

[21] Appl. No.: 362,409

[22] PCT Filed: Sep. 22, 1988

[86] PCT No.: PCT/JP88/00970
§ 371 Date: May 23, 1989
§ 102(e) Date: May 23, 1989

[87] PCT Pub. No.: WO89/03132
PCT Pub. Date: Apr. 6, 1989

[30] Foreign Application Priority Data
Sep. 26, 1987 [JP] Japan .................................. 62-241066
Mar. 10, 1988 [JP] Japan .................................. 63-31893

[51] Int. Cl.$^5$ ............................................. H01S 3/13
[52] U.S. Cl. ........................................ 372/32; 372/29; 372/58; 372/59; 372/20; 356/352

[58] Field of Search .................... 372/20, 99, 33, 58, 372/59, 55, 32; 356/351

[56] References Cited
U.S. PATENT DOCUMENTS

| 3,534,289 | 10/1970 | Clark et al. | 372/20 |
| 4,097,818 | 6/1978 | Manoukian et al. | 372/20 |
| 4,152,674 | 5/1979 | Taguchi | 372/99 |
| 4,743,114 | 5/1988 | Crane | 356/351 |
| 4,914,662 | 4/1990 | Nakatani et al. | 372/32 |

Primary Examiner—Léon Scott, Jr.
Attorney, Agent, or Firm—Wolf, Greenfield & Sacks

[57] ABSTRACT

A laser apparatus comprising a Fabry-Perot etalon for selecting a laser oscillation wavelength and a wavelength monitor means for monitoring a laser beam taken out from a laser oscillator whose wavelength is variable, whereby the pressure at the gap in the Fabry-Perot etalon is adjusted on the basis of a signal output from the wavelength monitor means. In order to adjust the pressure at the gap the Fabry-Perot etalon is hermetically sealed in a vessel containing a gas and the gas pressure is controlled on the basis of the output signal.

24 Claims, 5 Drawing Sheets

LASER APPARATUS

BACKGROUND ART

FIG. 1 is a schematic view showing a conventional wavelength tunable laser apparatus of the type mentioned, for example, in "Applied Optics", July 1974, vol. 13, No. 7, pp. 1625-1628. In the figure, the reference numeral 1 denotes a laser oscillator which is, in this case, a dye laser. The numeral 2 denotes a partially reflecting mirror, 3 a Fabry-Perot etalon (hereinafter abbreviated as "FP") provided with a gap, 4 a closed vessel in which the FP 3 is hermetically sealed with a gas, 5 a laser beam, 6 a pressure gauge for measuring the level of gas pressure inside the closed vessel 4, 7 and, 8 valves, and 9 a grating.

The operation will next be explained. The laser beam emitted from the laser oscillator 1 has a wavelength selected by various elements incorporated in the oscillator. In this prior art, the range of wavelengths is narrowed by means of spectroscopic elements, that is, the grating 9 and the FP 3, which are inserted in the resonator. Moreover, by adjusting these spectroscopic elements, it is possible to set the wavelength at a desired one within the range of oscillation wavelengths that have been present from the outset.

In this prior art, wavelength selection is effected by changing the angle of inclination of the grating 9 and further changing the gas pressure inside the closed vessel 4 to thereby vary the refractive index of the gas in the gap provided in the FP 3. Coarse adjustment of the wavelength can be effected by changing the angle of inclination of the grating 9, and fine adjustment of the wavelength can be achieved by adjusting the gas pressure in the gap of the FP 3. The adjustment of the gas pressure is effected by measuring the level of pressure with the pressure gauge 6 and opening or closing the valves 7 and 8.

The conventional laser apparatus which is arranged in the manner described above has the problem that it is necessary to use a pressure gauge which has a degree of accuracy of, for example, better than 0.1% of the full scale in order to perform wavelength tuning with high precision, e.g., tolerances of ±0.001 nm.

DISCLOSURE OF INVENTION

The laser apparatus according to the present invention is arranged such that an etalon is hermetically sealed with a gas and the gas pressure is changed with a feedback signal obtained by monitoring the laser beam, thereby effecting wavelength tuning and wavelength stabilization.

Figure 1:
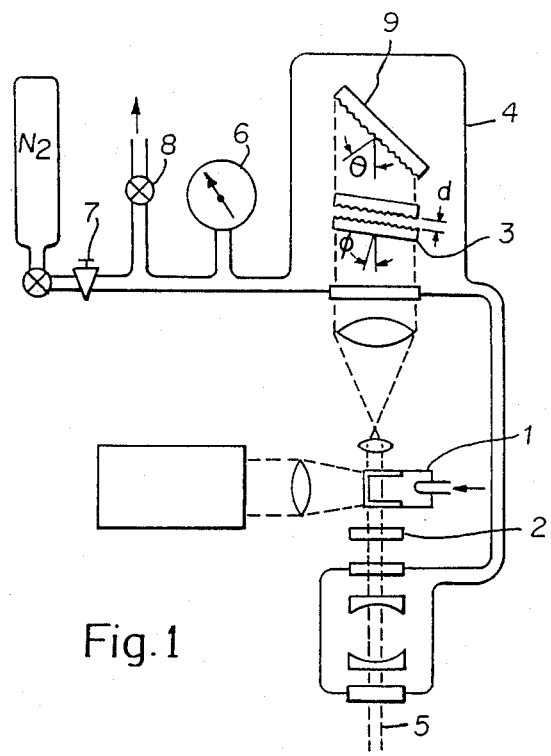
FIG. 1 is a schematic view showing a conventional apparatus.
Figure 2:
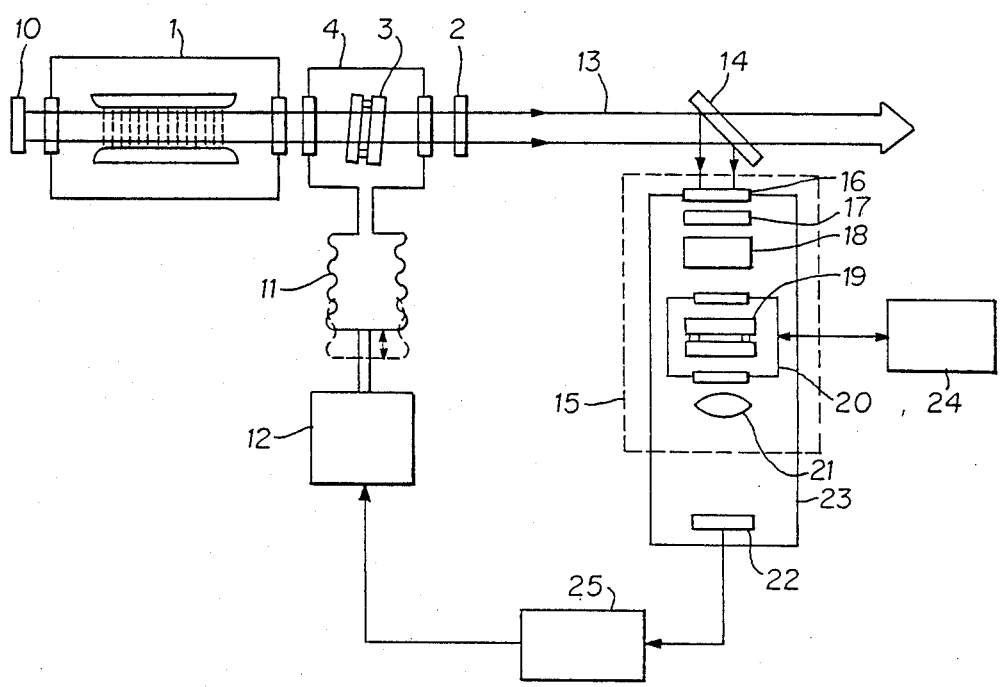
FIG. 2 is a block diagram showing one embodiment of the laser apparatus according to the present invention.

BEST MODE FOR CARRYING OUT THE INVENTION:

One embodiment of the present invention will be described below with reference to the drawings. In FIG. 2, the reference numerals 1 to 4 denote elements which are the same as those of the prior art. The wavelength tuning Fabry-Perot etalon (hereinafter abbreviated as "FP") 3 is accommodated in the closed vessel 4. The reference numeral 10 denotes a totally reflecting mirror which is disposed so as to face the partially reflecting mirror 2 across the FP 4, 11 a volume expanding and contracting means constituted by a bellows which is connected to the closed vessel 4, 12 a mechanism for driving the volume expanding and contracting means 11, 13 a laser beam emitted by the laser oscillator 1 via the totally reflecting mirror 10, the partially reflecting mirror 2 and the FP 3, 14 a beam takeout mirror for taking out a part of the laser beam 13, and 15 a wavelength monitor mechanism which subjects the laser beam taken out by the beam takeout mirror 14 to spectroscopic analysis. The wavelength monitor mechanism 15 comprises an interference filter 16 which passes only the laser beam 13, a filter 17 for adjustment of light intensity, an integrator 18 for diffusing the laser beam 13, an FP 19 for monitoring which is provided with a gap, a closed vessel 20 having the FP 19 hermetically sealed therein, and a lens 21. The numeral 22 denotes an imaging element for observing fringes formed by the FP 19, the imaging element 22 being, for example, a one-dimensional image sensor. The numeral 23 denotes a light-shielding box which contains the elements 16 to 22 and shields them from the ambient light, the light-shielding box 23 being disposed such that the laser beam from the beam takeout mirror 14 can enter the interference filter 16. The numeral 24 denotes a temperature control means for maintaining the temperature of the FP 19 at a constant level, and 25 an image processing means which analyzes the fringes and delivers an output to the driving mechanism 12.

The operation will next be explained. The laser beam emitted from the laser oscillator 1 has a wavelength selected by various elements incorporated in the oscillator. In the case of an excimer laser, for example, the range of oscillation wavelengths is originally several angstroms; however, the wavelength range can be narrowed by inserting spectroscopic elements such as a prism, grating, FP, etc. into the resonator. Moreover, by adjusting these spectroscopic elements, it is possible to set the wavelength at a desired one within the range of oscillation wavelengths present from the outset.

A part of the laser beam 13 thus obtained is led to the wavelength monitor mechanism 15. The wavelength monitor mechanism 15 employs the FP 19 to determine the wavelength.

In the above-described embodiment, circular fringes which appear when light passes through the FP 19 are utilized. The diameter of the fringes is related to $\theta$; therefore, the wavelength $\lambda_m$ is determined by obtaining $\theta$ and utilizing the following expression (1). The FP comprises two mirrors with a high degree of flatness which are disposed so as to face each other across a gap d. Light which passes at an angle of $\theta$ to the mirror surface has a specific center wavelength which may be expressed as follows:

$$\lambda_m = \frac{2nd\cos\theta}{m} \quad (1)$$

wherein
n: the refractive index at the gap
m: an integer

If an FP having a high resolving power is employed, it is possible to know the intensity of $\lambda_m$ in the laser oscillation wavelength distribution. Since laser beams generally have a certain angle of divergence, only a beam component which satisfies the above expression passes through the FP, thus forming coaxial fringes (ring-shaped interference fringes) around the optical axis of the beam.

The wavelength monitor mechanism 15 comprises an integrator 18 which weakens or diffuses the laser beam, an FP 19 and a lens 21. Among the divergent components generated by the integrator 18, only light with $\theta$ which satisfies the above expression passes through the FP 19 to reach the lens 21. If the focal distance of the lens is assumed to be f, light having a component of $\theta$ concentrates at a point which is $f\theta$ away from the focal point on the axis of the lens. Accordingly, if the point at which light concentrates is observed by means of the imaging element 22, $\theta$ is obtained and $\lambda$ can be calculated.

Figure 3:
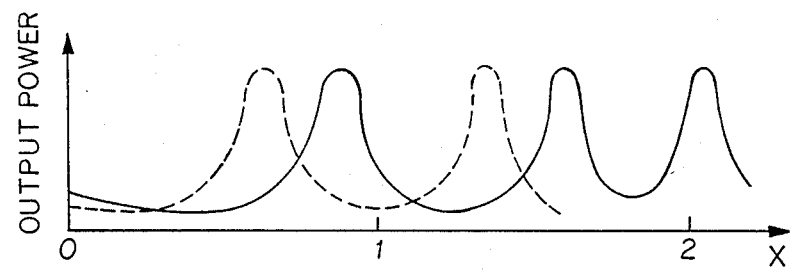
FIG. 3 is a chart showing the fringe intensity distribution on the imaging element 22.

Incidentally, the light intensity distribution on the imaging element 22 is as shown in FIG. 3. The axis of ordinate represents the output, while the axis of abscissa represents the distance x from the center of the fringes. Each peak corresponds to the order m of the FP. The space between each pair of adjacent peaks is called a free spectral range within which a wavelength can be determined uniformly. Moreover, since the free spectral range can be determined by the design of the FP, it is preferable to design it so as to be wider than a value at which a wavelength shift may be expected.

Since each peak has a light intensity distribution corresponding to the wavelength distribution of the laser beam, the image processing means 25 is needed to process it so as to obtain $\theta$. Further, in this embodiment the present wavelength $\lambda$ is calculated and the volume expanding and contracting means 11 is activated by the driving mechanism 12 in accordance with the result of the calculation to adjust the level of pressure inside the closed vessel 4, thereby adjusting the wavelength of the oscillator.

Although in the above-described embodiment the wavelength monitor mechanism is arranged to measure the fringes formed by the FP by the use of an imaging element, equivalent effects can be obtained by a wavelength monitor mechanism adopting another method.

Figure 4:
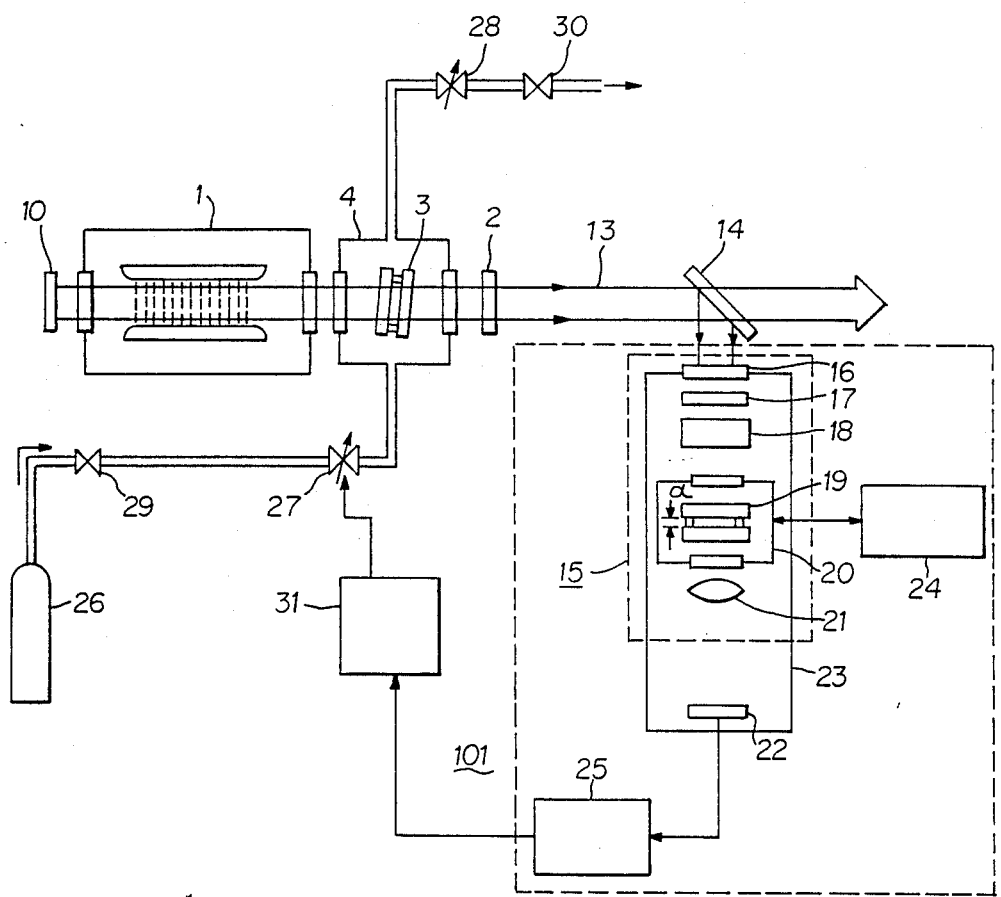
FIG. 4 is a block diagram showing another embodiment of the present invention.

FIG. 4 is a block diagram showing another embodiment of the present invention. Reference numerals which are the same as those in the foregoing embodiment denote the same elements. The reference numeral 26 denotes a gas cylinder for suppling a clean gas to the closed vessel 4, 27, 28 gas flow control valves provided at the inlet and outlet sides, respectively, of the closed vessel 4, 29, 30 stop valves similarly provided at the inlet and outlet sides, respectively, of the closed vessel 4, and 31 a controller for controlling the gas flow control valve 27 in response to a signal output from a wavelength monitor means 101.

The controller 31 knows the wavelength of the laser beam 13 at the present time by receiving the output from the image processing means 25 and controls the gas flow control valve 27 to adjust the gas pressure around the FP3 for wavelength selection so that the wavelength of the laser beam 13 becomes a predetermined value. The gas flow control valve 27 is controlled by a manual operation in the initial stage of the adjustment. The wavelength selecting operation of the FP3 is the same as in the case of the waveform monitoring FP19. Although in this embodiment only the gas flow control valve 27 provided at the inlet side of the closed vessel 4 is controlled by the controller 31, the gas flow control valve 28 at the outlet side may be controlled and it is also possible to control both of them to adjust the gas pressure inside the closed vessel 4. Further, the gas flow rate (hence gas pressure) may be controlled by means of orifices, mass flow controllers, etc. in place of the valves.

Figure 5:
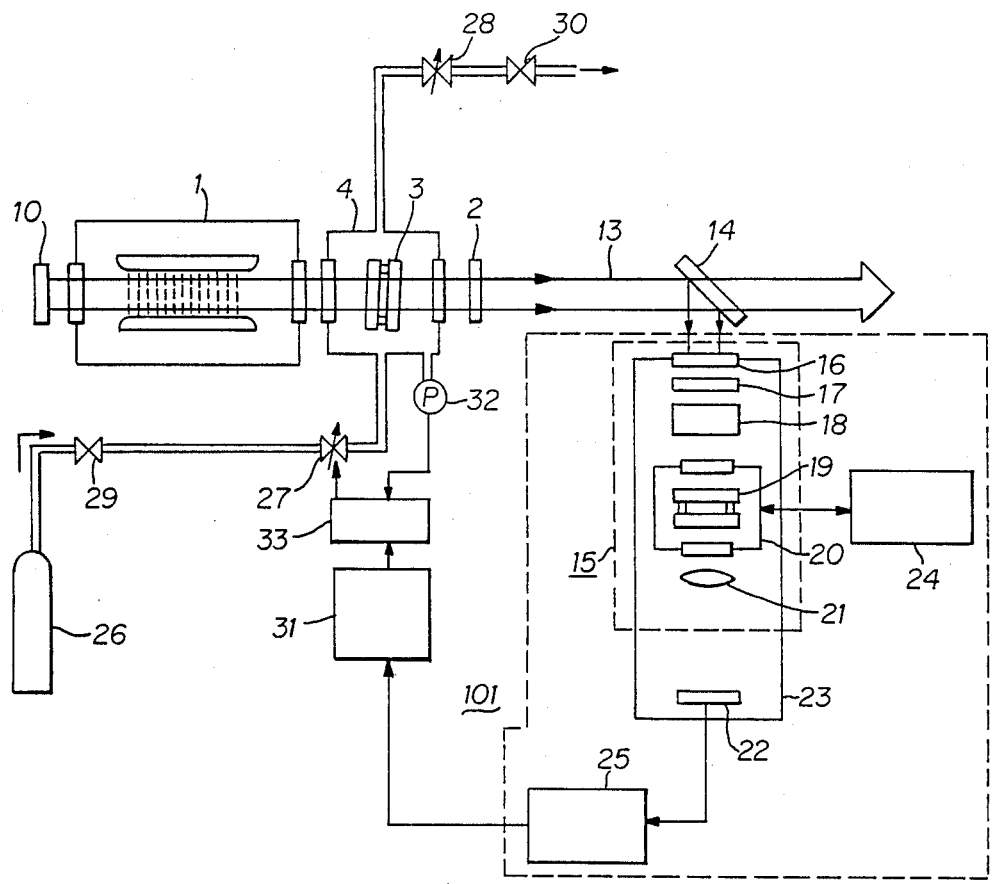
FIG. 5 is a block diagram showing still another embodiment.

FIG. 5 is a block diagram showing still another embodiment of the present invention, which is formed by adding a pressure sensor 32 and a uniform pressure control device 33 to the arrrangement shown in FIG. 4. More specifically, the closed vessel 4 is provided with the pressure sensor 32 and a signal output from the pressure sensor 32 and a signal output from the controller 31 which has waveform information are input to the uniform pressure control device 33 so that the controller 31 controls the gas flow control valve 27 through the device 33. Thus, it is possible to facilitate adjustment of the gas pressure inside the closed vessel 4.

It should be noted that the reason why in the foregoing embodiments the wavelength monitoring FP 19 is not provided in an atmosphere in which a clean gas circulates as in the case of the FP 3 for wavelength selection is that only a part of the laser beam 13 is allowed to enter the FP 19. It is better to provide the FP 19 in an atmosphere in which a clean gas circulates.

Although the above-described wavelength monitor means 101 is arranged to measure the fringes formed by the light passing through the FP 19 by means of the fringe imaging element 22, the wavelength may be measured by another method.

INDUSTRIAL APPLICABILITY

The present invention is applicable to wavelength stabilization in a laser appratus, for example, an excimer laser apparatus.

We claim:
1. A laser apparatus comprising:
a laser means for generating a laser beam;
a wavelength control means for controlling a wavelength of the laser beam comprising a gas-filled vessel;
a wavelength monitoring means for determining the wavelength of the laser beam; and
control means responsive to the wavelength monitoring means for controlling a pressure of the gas in the gas-filled vessel.

2. The apparatus for claim 1 wherein the wavelength control means further comprises a first Fabry-Perot etalon having a gas-filled gap wherein changes in the pressure of the gap in the gap control the wavelength of the laser beam.

3. The apparatus of claim 1 wherein the control means further comprises a controller means and a volume changing means responsive to the controller means for changing the pressure of the gas in the gap.

4. The apparatus of claim 1 wherein the control means further comprises a controller means and an inlet gas flow control means responsive tot he controller means for controlling gas flow into the gas-filled vessel for changing the pressure of the gas in the gap.

5. The apparatus of claim 4 wherein the inlet gas flow control means comprises value means.

6. The apparatus of claim 1 wherein the control means further comprises a controller means and an outlet gas flow control means responsive to the controller means for controlling gas flow out of the gas-filled vessel for changing the pressure of the gas in the gap.

7. The apapratus of claim 6 wherein the outlet gas flow control means comprises value means.

8. The apparatus of claim 1 wherein the control means further comprises a controller means and a uniform pressure control means responsive to the pressure of the gas in the gap and the controller means for controlling gas flow to change the pressure of the gas in the gap.

9. The apparatus of claim 8 further comprising gas flow control means responsive to the uniform pressure control means.

10. The apparatus of claim 9 wherein the gas flow control means comprises value means.

11. The apparatus of claim 1 wherein the wavelength monitoring means comprises a second Fabry-Perot etalon having a second gap.

12. The apparatus of claim 11 further comprising temperature control means for maintaining a temperature of the second Fabry-Perot etalon at a constant level.

13. The apparatus of claim 12 further comprising an integrator means for diffusing the laser beam.

14. The apparatus of claim 13 further comprising an intensity filter means for adjusting a light intensity supplied to the integration means.

15. The apparatus of claim 14 further comprising an interference filter means for supplying only energy from the laser beam to the intensity filter means.

16. The apparatus of claim 11 further comprising a hemetically sealed vessel means for containing the second Fabry-Perot etalon.

17. The apparatus of claim 1 further comprising an image processing means intercoupled between the wavelength monitoring means and the control means, said image processing means comprising means responsive to the wavelength monitoring means for generating a signal to control the control means.

18. The apparatus of claim 17 further comprising an imaging element means intercoupled between the wavelength monitoring mans and the image processing means.

19. The apparatus of claim 18 further comprising a lens means for focusing at least one fringe generated by the second Fabry-Perot etalon on to the imaging element means.

20. The apparatus of claim 19 further comprising a beam takeout means for taking out at least a portion of the laser beam and transmitting said portion to the wavelength monitoring means.

21. The apparatus of claim 20 further comprising a light shielding box containing the wavelength monitoring means and the imaging element means.

22. The apparatus of claim 1 wherein the gas-filled vessel comprises a hemetically sealed vessel means.

23. A laser apparatus comprising:
a generator for producing a laser beam;
a first Fabry-Perot etalon contained within a first gas-filled vessel for controlling a wavelength of the laser beam produced by the generator;
a second Fabry-Perot etalon contained within a second gas-filled vessel for monitoring the wavelength of the laser beam transmitted by the first Fabry-Perot etalon; and
a control device, responsive to the monitored wavelength, for controlling a pressure of the gas in the first gas-filled vessel.

24. A method for controlling a wavelength in a laser apparatus comprising the steps of:
providing a wavelength control device;
monitoring a wavelength of a laser beam output by the wavelength control device; and
controlling a gas pressure inside the wavelength control device in response to the monitored wavelength.

* * * * *